United States Patent
Bredenfeld

(10) Patent No.: US 6,371,273 B1
(45) Date of Patent: Apr. 16, 2002

(54) WORKPIECE CARRIER, ESPECIALLY FOR A BELT CONVEYOR

(75) Inventor: Guido Bredenfeld, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/334,293

(22) Filed: Jun. 16, 1999

(30) Foreign Application Priority Data

Jun. 17, 1998 (DE) .......................... 198 26 863

(51) Int. Cl.⁷ .................. B65G 15/64; B65G 29/00; B65G 37/00
(52) U.S. Cl. ................... 198/345.3; 198/465.1
(58) Field of Search .................. 198/465.3, 465.1, 198/465.2, 345.3

(56) References Cited

U.S. PATENT DOCUMENTS

| | | | | |
|---|---|---|---|---|
| 4,509,429 A | * | 4/1985 | de Broqueville | 104/167 |
| 4,887,809 A | * | 12/1989 | Eberle | 198/792 |
| 5,503,264 A | * | 4/1996 | Eberle | 198/343.1 |
| 2001/0030162 A1 | * | 10/2001 | Summa et al. | 213/62 |

FOREIGN PATENT DOCUMENTS

| | | |
|---|---|---|
| DE | 1 256 153 | 12/1967 |
| DE | 39 26 755.5 | 2/1991 |
| EP | 0 316 990 | 5/1989 |
| GB | 601.719 | 5/1948 |

* cited by examiner

*Primary Examiner*—Joseph E. Valenza
*Assistant Examiner*—Kenneth W Bower
(74) *Attorney, Agent, or Firm*—Michael J. Striker

(57) ABSTRACT

A workpiece carrier (10) for conveying one or more workpieces with a belt conveyor (12,18) is described, which reduces the production cycle time of an industrial manufacturing plant. The workpiece carrier (10) includes energy storage devices (24,32,38), into which energy of motion of the workpiece carrier (10) is transferred when the workpiece carrier is braked against or stopped on the belt conveyor (12,18). The energy storage devices each include a coupling element (28,36), advantageously a friction wheel 28 or contacting piece 36, urged into continuous contact with the conveyor belt, and a spring device, advantageously a spiral spring 30 or a coil spring 34, connected with the friction wheel and put under tension when the workpiece carrier (10) is braked. If the workpiece carrier is no longer braked or stopped, the spring device is released and delivers stored energy by driving the friction wheel or contacting piece, where by the workpiece carrier (10) is additionally accelerated.

9 Claims, 2 Drawing Sheets

US 6,371,273 B1

WORKPIECE CARRIER, ESPECIALLY FOR A BELT CONVEYOR

BACKGROUND OF THE INVENTION

1. Field of the Invention

The present invention relates to a workpiece carrier and, more particularly, to a workpiece carrier for transport by at least one belt conveyor, especially a double belt conveyor.

2. Related Art

A workpiece conveyor for conveying one or more workpieces by means of a belt conveyor, especially a double belt conveyor, is described in European Patent Document EP 37 361 B1. This sort of workpiece carrier is used in industrial assembly and manufacturing plants. The workpiece carrier or support is placed on the belt conveyor and is conveyed by a frictional connection between the belt conveyor and the workpiece carrier. These workpiece carriers are brought to a stop in front of transfer points to other belt conveyors or processing stations. This usually happens by means of a stopping device having a traveling holding element that can travel into the motion path of the workpiece carrier and thereby stop it. If the workpiece carrier is stopped, the belt conveyor slides past the workpiece carrier under the workpiece carrier. If the workpiece carrier is no longer braked, i.e. the holding element of the stopping device releases the workpiece carrier so that it can travel over the motion path. The workpiece carrier still requires a predetermined time interval in order to reach the processing station or the transfer point by means of the belt conveyor. Still more time can be lost by the motion of the belt conveyor under the workpiece carrier during travel. In any case the total machine cycle time for the concerned fabrication and assembly unit increases.

SUMMARY OF THE INVENTION

It is an object of the present invention to provide an improved workpiece carrier for a belt conveyor of the above-described kind, which does not suffer from the above-mentioned disadvantages.

According to the invention the workpiece carrier for conveying one or more workpieces with at least one belt conveyor comprises at least one energy storage means, which stores energy transferred to it when the workpiece carrier is stopped on or braked against the at least one belt conveyor and which releases the stored energy when the workpiece carrier is no longer braked or stopped on the at least one belt conveyor, whereby the workpiece carrier experiences an additional acceleration.

The workpiece carrier according to the invention has the advantage that during travel, i.e. when the workpiece carrier is no longer braked, less time is lost.

In an especially simple and advantageous embodiment of the invention a spiral spring is put under tension or a coil spring is compressed by means of the conveyor motion of the belt conveyor via a coupling element, advantageously a friction wheel or contacting piece, when the workpiece carrier is braked against or stopped on the belt conveyor. In another preferred embodiment the friction properties of the workpiece carrier on the conveyor belt may be optimized by means of a layer or coating with anisotropic friction properties. The amount of friction between the coupling element and the belt conveyor may be improved by a pressing spring element acting on the coupling element. If the pressing spring is dimensioned so that the workpiece carrier contacts on the belt conveyor only via the energy storing means, all undesirable friction may be eliminated.

Further features and advantages are described in the detailed description and claims appended hereinbelow.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
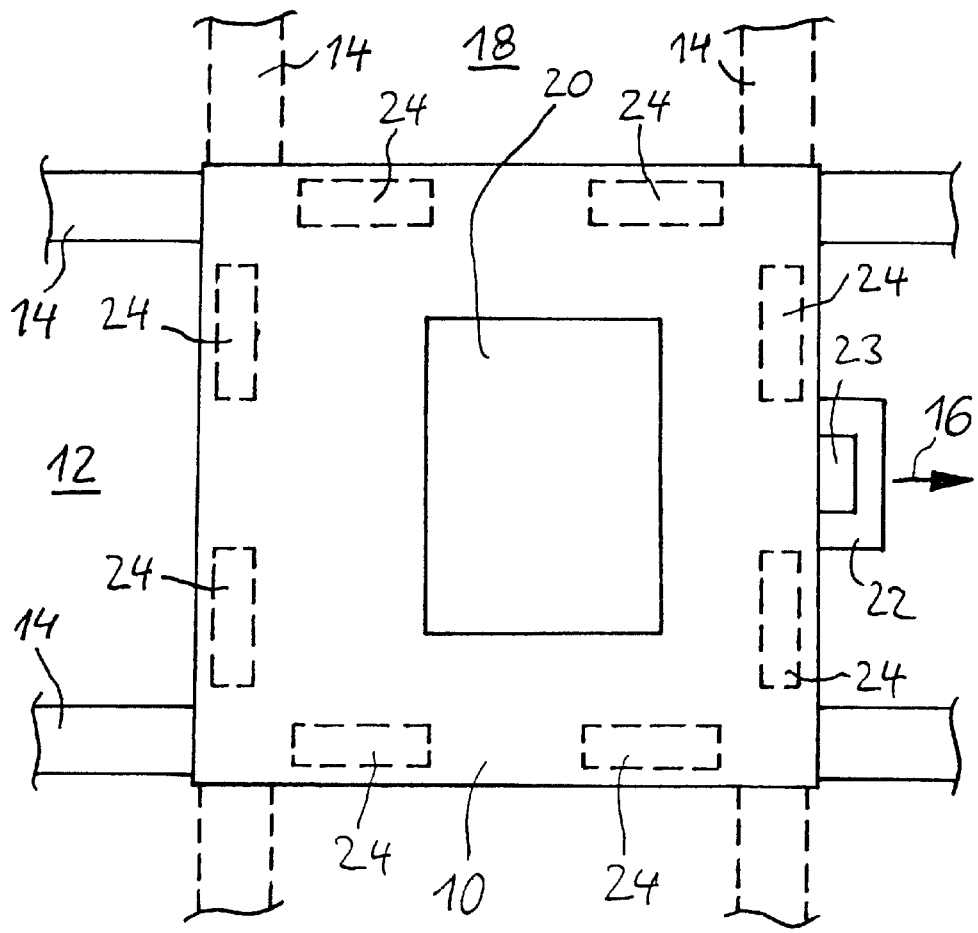
FIG. 1 is a partially cutaway top plan view of a workpiece carrier on a belt conveyor, cutaway to show the energy storage means of the invention.

A workpiece carrier 10 is shown in FIG. 1, which is placed on a first belt conveyor 12, of which only one segment is shown. The belt conveyor 12 has two parallel extending belts 14 and thus is a so-called double belt conveyor. Alternatively the belt conveyor 12 could be a belt conveyor which has only one belt of a width such that the workpiece carrier 10 can be transported on it. The transport direction 16 of the belt conveyor 12 is shown with an arrow in FIG. 1. A second belt conveyor 18 is indicated at right angles to the first belt conveyor 12 with dashed lines in FIG. 1. The workpiece carrier 10 can similarly be conveyed along the second belt conveyor 18. A workpiece 20 is only shown symbolically on the workpiece carrier 10. Also it can carry several workpieces. A stopping device 22 with a travelling holding element 23 is arranged upstream of the workpiece carrier 10 in the conveying direction 16. The stopping device 22 acts to halt the work piece carrier 10, which will be explained in more detail later.

Dashed boxes show several energy storage devices 24 that are attached to the workpiece carrier 10 in FIG. 1. In the instant embodiment two energy storage means 24 are arranged one after the other on each belt 14, so that they can cooperate with the respective belts 14 of the belt conveyor 12 or 18. Also four energy storage means 24 are provided for each of the two conveying directions 16 at right angles to each other. Two energy storage means 24 arranged one after the other are spaced so that, when they are not in use, they do not prevent the transport of the workpiece carrier 10 on the respective belt conveyor 12, 18, i.e. the outer spacing of two of the energy storage means 24 arranged behind each other which are used on the belt conveyor 12 is less than the smallest distance between the belts 14 of the belt conveyor 18, and vice versa. In any case it is important that the workpiece carrier 10 has at least one energy storage means 24. It is however advantageous when at least two energy storage means 24 are provided for each transport direction 16 for the workpiece carrier 10. Herein an energy storage means 24 is provided for each belt 14 of the belt conveyor 12, 18.

Figure 2:
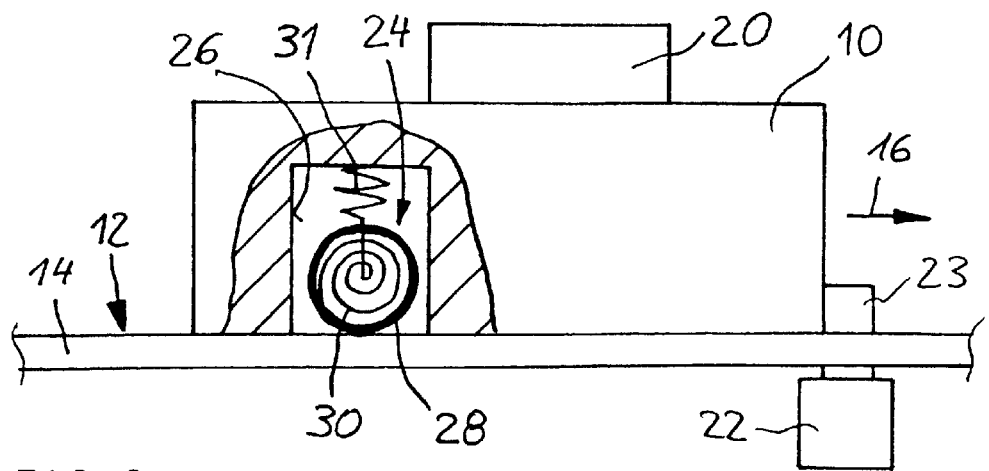
FIG. 2 is a side view of the device shown in FIG. 1 with a first embodiment of the energy storage means.

FIG. 2 the workpiece carrier is cutaway to show a cavity 26. A first possible embodiment of an energy storage means 24 is arranged in this cavity 26 and shown in simplified form in FIG. 2. The energy storage means 24 has a rotatable friction wheel 28 operating as a coupling element, which is effectively connected with the belt conveyor 12, 18. The energy storage means 24 has a spring device comprising a spiral spring 30, which is in effective connection with the friction wheel 28, i.e. the spiral spring 30 is tensioned by means of the friction wheel 28. A pressing spring 31 is arranged in the workpiece carrier. It is connected with a central part of the spiral spring 30 so that the energy storage means 24 is pressed on the belt conveyor 12, 18 by the pressing spring, whereby the friction between the friction wheel 28 and the respective belt 14 is increased.

The workpiece carrier 10 is shown in the stopped position on the continuously travelling belt conveyor 12 because of the action of the holding element 23 of the stopping device 22, which extends into the motion path of the workpiece carrier 10. The holding element 23 travels below the conveyor plane in which the belt 14 of the belt conveyor 12, 18 moves by means of pneumatic operation of the stopping device 22, so that the workpiece carrier 10 travels further.

In normal operation the workpiece carrier 10 for transport by the conveyor belt 12, 18 has the same speed as the belt conveyor belt 12,18. A workpiece carrier 10 is halted, for example by the holding element 23 of the stopping device 22, in front of or immediately upstream of a work station or processing station or a transfer point at which the workpiece carrier 10 is transferred, for example from the belt conveyor 12 to the belt conveyor 18. This is necessary when an additional workpiece carrier 10 is immediately found in a processing station or at a transition point from one belt conveyor 12 to another belt conveyor 18. Thus several workpiece carriers 10 can be found one after the other on a belt conveyor 12. If the processing station or the transition point is again free, the next workpiece carrier 10 can arrive. The time that is required for the workpiece carrier 10 to arrive in the work or processing station is however lost, since no processing can occur in this time, whereby the product cycle time of the entire manufacturing operation increases.

When the workpiece carrier 10 according to the invention is located immediately in a waiting position, i.e. its travel on the belt conveyors 12, 18 is halted, so that the speed of the workpiece carrier 10 is zero. The speed of the belt 14 of the belt conveyor 12, 18 however is not changed. When the belt 14 moves in the transport or conveying direction 16 indicated in FIG. 2, i.e. to the right in the drawing, the friction wheel 28 is rotated by the conveying motion in a counter-clockwise direction. The spiral spring 30 is put under tension because of this motion, so that it receives energy. So that the spiral spring 30 is not put under too much tension by rotation of the friction wheel 28, the friction wheel 28 is pressed by the pressing spring 31 against the belt 14. When the workpiece carrier 10 is released by the holding element 23, i.e. when the motion of the workpiece carrier is no longer braked, the spiral spring 30 can loose its tension, thus giving up some of the energy that it received. In FIG. 2 one sees that the friction wheel rotates in a clockwise sense because of that. The workpiece carrier 10 thus experiences an additional acceleration in the conveying direction 16. Preferably this additional acceleration is large enough so that the speed of the workpiece carrier 10 is larger than that of the belt conveyor 12. In this way the cycle time of the manufacturing operation or plant can be strongly reduced. The principle of reduction of the operating time or cycle time is thus based on the fact that energy is transferable into the workpiece carrier from a workpiece carrier braked relative to the belt conveyor. In a workpiece carrier 10 no longer braked relative to the belt conveyor 12, 18 the received energy is again released so that the workpiece carrier 10 experiences the additional acceleration. The transfer of the energy occurs by means of the conveyor motion of the belt conveyor 12, 18. The friction wheel 28 operates as a coupling element, the spiral spring as the energy storage means.

A transfer of energy occurs in this case not only in a workpiece carrier 10 whose speed is zero. As soon as the speed of the workpiece carrier 10 drops below that of the belt conveyor 12, 18, energy is transferred into the energy storage means 24. A reduced speed can occur when several workpiece carriers 10 are blocked one after the other on the belt. It is also possible for energy to be transferred into an energy storage device 24 in another form when the workpiece carrier 10 is halted. This occurs by means of the conveyor motion of the belt conveyor 12,18. This can occur, for example, by means of additional devices arranged beside or below the belt conveyor 12, 18, which build up the tension in a spiral spring 30 by a suitable mechanism. This received energy can also be delivered in the other form. It would also be possible to provide a separate block, in which a coupling element is braced, in order to deliver energy from the energy storage means to the block. The transfer of energy by the conveying motion of the belt conveyor 12, 18 is however the simplest method.

Figure 3:
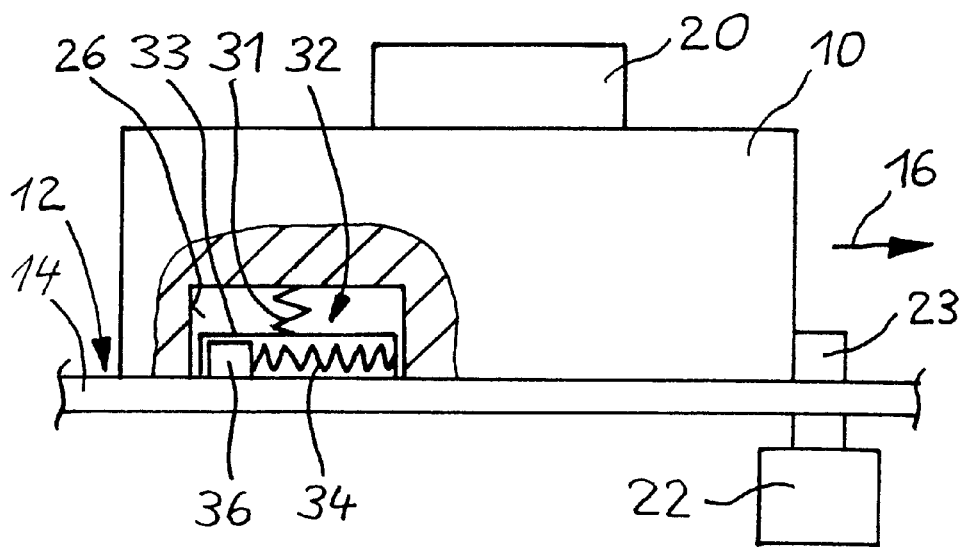
FIG. 3 is a side view of another embodiment of a workpiece carrier according to the invention with a second embodiment of the energy storage means.
Figure 4:
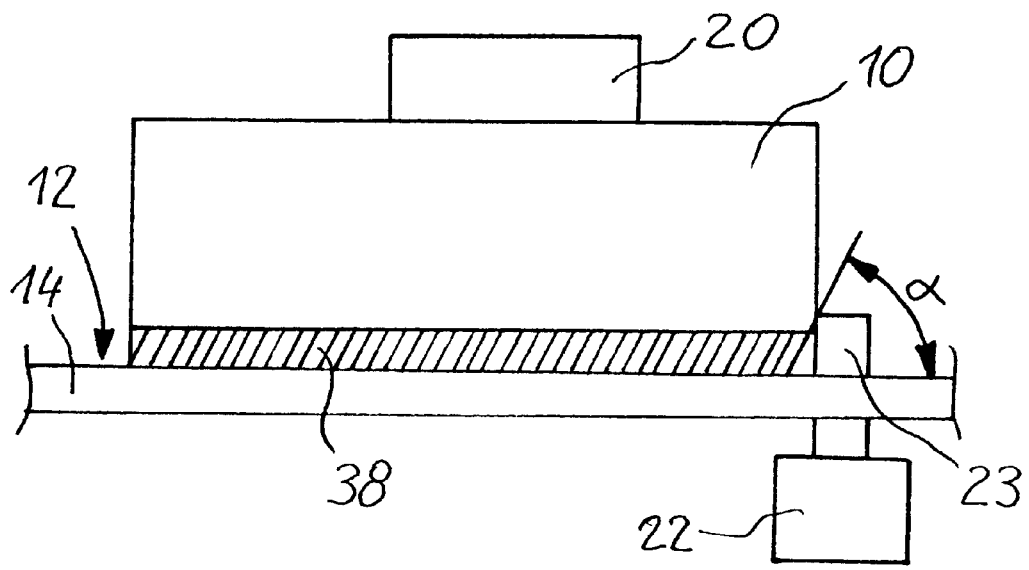
FIG. 4 is a side view of an additional embodiment of a workpiece carrier according to the invention with a third embodiment of the energy storage means.

A second embodiment of a workpiece carrier 10 is shown in FIG. 3 including a second embodiment of the energy storage means 32. This energy storage means 32 is accommodated in a cavity 26 provided in the workpiece carrie 10. The energy storage means 32 comprises a coil spring 34 acting essentially parallel to the belt 14 and a contacting piece 36 acting as a coupling element and connected with the coil spring 34 arranged in a receptacle 33. The receptacle 33 is open on its side facing the belt 14 and is pressed by means of a pressing or compressed spring 31 against the belt conveyor 12, 18. The receptacle 33 is arranged so that it is movable essentially perpendicular to the conveying direction 16 of the belt conveyor 12, 18. If the workpiece carrier 10 is braked against the belt conveyor 12, 18, the contacting piece 36 is pushed by the belt 14 in the direction of conveying 16. Because of that the coil spring 34 is compressed, i.e. it stores energy. If the workpiece carrier 10 is no longer braked, the coil spring 34 is released from tension and gives up the energy it received, whereby the workpiece carrier 10 is accelerated relative to the belt conveyor 12, 18.

An elastic layer extends or projects from the workpiece carrier 10, which cooperates with the belt conveyor 12,18. This elastic layer or coating comprises bristles 38 in the embodiment shown. Because of motion of the belt conveyor 12,18 in the conveying direction 16 of the belt conveyor 12, 18 the bristles 38 are oriented at an angle α, which is less than 90°. Thus the layer or coating provided between the workpiece carrier 10 and the belt conveyor 12, 18 by the bristles 38 has a first friction coefficient $\mu_1$ at a speed of the workpiece carrier 10 which is less than the speed of the belt conveyor 12, 18. The ends of the bristles are bent toward the direction of transport 16 because of the higher speed of the belts 14 relative to the workpiece carrier 10. If the workpiece carrier 10 is released or no longer braked, the bristles 38 bend back into their initial positions because of their elastic properties and the workpiece carrier 10 experiences an additional acceleration. Ideally the speed of the workpiece carrier 10 is raised relative to the speed of the belt conveyor 12, 18. That means that the layer or coating, e.g. provided by bristles 38, has a second friction coefficient $\mu_2$ that is less than the first friction coefficient $\mu_1$ when the workpiece carrier speed of the workpiece carrier 10 is higher than the speed of the belt conveyor 12, 18. Thus the workpiece carrier essentially has anisotropic friction properties in this situation. Ideally the bristles 38 however are used in combination with the energy storage means 24 or 32. The friction between the workpiece carrier 10 and the belt 14 of the belt conveyor 12, 18 acts oppositely to an acceleration caused by the energy storage means 24,32 when the workpiece carrier 10 is released or when it is no longer braked. Use of the bristles 38 reduces the friction reducing the acceleration.

The invention avoids the friction problems in the simplest possible manner because the workpiece carrier 10 is in contact with the belts 14 of the belt conveyor 12,18 only by means of a friction wheel 28 of the energy storage means 24. The sum of the friction forces of the pressing springs 31 of the four energy storage means 24 provided for each transport direction 16 must be greater than the operational weight of the workpiece carrier 10 including that of the workpiece carrier being conveyed in operation.

The disclosure in German Patent Application 198 26 863.7-22 of Jun. 17, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a workpiece carrier, especially for a belt conveyor, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A workpiece carrier (10) for conveying one or more workpieces (20) in at least one conveying direction (16) by means of at least one belt conveyor (12,18), said workpiece carrier (10) comprising at least one energy storage means (24,32) for storing energy of motion of the workpiece carrier (10) in the at least one conveying direction (16) when said workpiece carrier (10) is braked relative to said belt conveyor, said at least one energy storage means (24,32) comprising a coupling element (28,36) in continuous contact with said at least one belt conveyor so that said coupling element rotates or moves when said workpiece carrier (10) is braked or stopped and spring means (30,34) connected with said coupling element so that said spring means is put under tension or compressed when said coupling element rotates or moves, so that energy stored in said spring means (30,34) is again released when said workpiece carrier (10) is released or no longer braked and thus said workpiece carrier (10) experiences an acceleration in said at least one conveying direction (16).

2. The workpiece carrier as defined in claim 1, wherein said coupling element is a rotatable friction wheel (28) and said spring means includes a spiral spring (30) connected with the friction wheel so that said spiral spring is put under tension when said friction wheel rotates.

3. The workpiece carrier as defined in claim 1, wherein said coupling element is a contacting piece (36) in continuous contact with said at least one belt conveyor (12,18) and said spring means includes a coil spring (34) which is compressed when said contacting piece (36) moves in relation to said at least one belt convey (12,18).

4. The workpiece carrier as defined in claim 3, further comprising a layer (38) arranged between said workpiece carrier (10) and said at least one belt conveyor (12,18) and wherein the workpiece carrier (10) has a workpiece carrier speed in the at least one conveying direction (16), the at least one belt conveyor (12,18) has a conveyor speed in the at least one conveying direction, the layer (38) has a first friction coefficient ($\mu_1$) for motion of the layer (38) on the at least one belt conveyor when the workpiece carrier speed of the workpiece carrier (10) is less than the conveyor speed and a second friction coefficient ($\mu_2$) for motion of the layer (38) on the at least one belt conveyor when the workpiece carrier speed of the workpiece carrier (10) is greater than the conveyor speed, and the second friction coefficient ($\mu_2$) is less than the first friction coefficient ($\mu_1$).

5. The workpiece carrier as defined in claim 4, wherein said layer (38) comprises elastic bristles extending from said workpiece carrier and cooperating with said at least one belt conveyor (12,18), whereby said elastic bristles are oriented at an angle ($\alpha$) less than 90° in relation to said at least one conveying direction (16).

6. The workpiece carrier as defined in claim 2, further comprising a layer (38) arranged between said workpiece carrier (10) and said at least one belt conveyor (12,18), and wherein the workpiece carrier (10) has a workpiece carrier speed in the at least one conveying direction (16), the at least one belt conveyor (12,18) has a conveyor speed in the at least one conveying direction, the layer (38) has a first friction coefficient ($\mu_1$) for motion of the layer (38) on the at least one belt conveyor when the workpiece carrier speed of the workpiece carrier (10) is less than the conveyor speed and a second friction coefficient ($\mu_2$) for motion of the layer (38) on the at least one belt conveyor when the workpiece carrier speed of the workpiece carrier (10) is greater than the conveyor speed, and the second friction coefficient ($\mu_2$) is less than the first friction coefficient ($\mu_1$).

7. The workpiece carrier as defined in claim 1, wherein said at least one energy storage means (24,32) includes a pressing spring (31) connected to said coupling element (28,36), whereby said coupling element (28,36) is urged to contact said at least one belt conveyor (12,18).

8. A workpiece carrier (10) for conveying one or more workpieces (20) in a plurality of conveying directions by means of a plurality of belt conveyors having transfer points between said belt conveyors, said workpiece carrier (10) comprising at least two energy storage means (24,32) for each of said conveying directions, said energy storage means for one of said conveying directions acting to store energy of motion of the workpiece carrier (10) in said one of said conveying directions when said workpiece carrier (10) moving in said one of said conveying directions is braked against said belt conveyor carrying said workpiece carrier in said one of said conveying directions, and wherein each of said energy storage means (24,32) comprises a coupling element (28,36) in continuous contact with a respective one of said belt conveyors so that said coupling element rotates or moves when said workpiece carrier (10) is braked against or stopped on said respective one of said belt conveyors and spring means (30,34) connected with said coupling element (28,36) so that said spring means is put under tension when said coupling element (28,36) rotates or moves, whereby energy stored in said spring means (30,34) is again released when said workpiece carrier (10) is released or no longer braked and said workpiece carrier (10) experiences an acceleration in said at least one conveying direction (16).

9. The workpiece carrier (10) as defined in claim 8, wherein each of said energy storage means (24,32) includes a pressing spring (31) connected to said coupling element (28,36), whereby said coupling element (28,36) is urged to contact one of said belt conveyors (12,18) by pressing said coupling element against said one of said belt conveyors (12,18) with a pressing force, said at least one energy storage means (24,32) for each of said conveying directions consisting of four of said energy storage means (24,32) and a sum of the pressing forces of said pressing springs (31) of said four energy storage means for each of said conveying directions is greater than an operational weight of said workpiece carrier (10) and any of said workpieces carried on said workpiece carrier during operation thereof.

* * * * *